United States Patent [19]

Dechow et al.

[11] Patent Number: 4,522,836

[45] Date of Patent: Jun. 11, 1985

[54] UPFLOW ION EXCHANGE TREATMENT OF NATURAL EDIBLE JUICES CONTAINING HIGH ACIDITY AND SUSPENDED SOLIDS

[75] Inventors: Fred J. Dechow, Midland, Mich.; Donald H. Mitchell; Richard M. Pearce, both of Winter Haven, Fla.; C. Byron Smith, Lake County, Fla.; Sand T. Brown, Lakeland, Fla.

[73] Assignee: Mitco Water Laboratories, Inc., Winter Haven, Fla.

[21] Appl. No.: 496,346

[22] Filed: May 19, 1983

[51] Int. Cl.$^3$ .............................................. A23L 2/36
[52] U.S. Cl. ................................... 426/271; 210/661; 210/678; 426/599
[58] Field of Search ............... 127/46.2; 210/661, 678, 210/683; 426/271, 599, 330.5, 333, 422

[56] References Cited

U.S. PATENT DOCUMENTS

| | | | |
|---|---|---|---|
| 3,801,717 | 4/1974 | Huffman | 426/271 |
| 3,982,956 | 9/1976 | Schoenrock et al. | 127/46.2 |
| 4,140,541 | 2/1979 | Popper | 210/661 |

*Primary Examiner*—Ivars Cintins

[57] ABSTRACT

A naturally acidic, edible fruit or vegetable juice containing a significant concentration of suspended matter, such as pulp, is effectively subjected to ion exchange without substantial loss in pulp content by passing the juice through a supported laterally confined particulate bed of a weak base anionic resin in an upwardly flowing direction through the bed at a liquid velocity which is sufficient to cause the bed to undergo a vertical expansion of at least about 20-25% by volume and preferably 50% but not so great as to cause significant entrainment of resin particles in the treated juice. The volume of the resin relative to the throughput of juice is large enough to extract a substantial amount of the natural acidity of the juice. Preferably, the juice is passed through the bed at a rate sufficient to impart to the expanded bed a slowing rolling motion at least in the region adjacent its upper surface. The acid content of the treated product is much reduced from the original value while the sweetness thereof undergoes little or no impairment so as to produce ratios of Brix numbers to acid content of at least about 30 and generally 50 or higher. The treated product can be blended with an untreated juice to obtain a marketable blend having values within commercial limits.

6 Claims, No Drawings

UPFLOW ION EXCHANGE TREATMENT OF NATURAL EDIBLE JUICES CONTAINING HIGH ACIDITY AND SUSPENDED SOLIDS

FIELD OF THE INVENTION

This invention relates to the treatment of fruit and vegetable juices, especially citrus juices and the like, to reduce their perceptible acidity and is concerned more specially with an improved process for contacting a natural acidic edible juice containing a high concentration of suspended solids with an ion exchange medium to reduce such acidity.

BACKGROUND OF THE INVENTION

It is known in the art that fruit juices such as citrus juices can by means of an ion exchange treatment be made to undergo a change in the perceptive acidity of such juices. Taste tests have established that the natural acidity of such juices is objectionably strong to a significant number of prospective purchasers who would prefer a less tart or sharp flavor. A process to achieve this result was first disclosed by Kilburn et al in U.S. Pat. No. 3,165,415, filed Oct. 4, 1960 and issued Jan. 12, 1965, wherein the juice to be treated was passed through a multi-compartment electrodialysis system in alteration compartmentwise with a liquid electrolyte, the compartments being separated by an anion selective membrane permeable to passage therethrough of ions extracted from the juice and the electrolyte to thereby substitute one for the other and consequently alter the pH of the juice being treated. The process was described as equally useful for inducing an increase in the pH of a pH deficient juice, such as tomato juice, as to decrease the pH of an excessively acidic juice, such as orange or grapefruit juice, the ion permeable membrane being in the one case a film of a cation exchange resin and in the other case a film of an anionic exchange resin. The basis of this discovery was that, although the pH of natural fruit juices changes during their natural production season, the concentration of salts of weak acids which such juices contain remains substantially constant throughout such season. Hence, although the theoretical pH of any buffered solution, i.e., containing a free acid and its salts, depends upon the relative concentrations of both of the free acid and the salt, if the salt concentration remains constant, it follows that overall pH variation must in the case of citric acids be due to the free acid content of such juices. This creates the possibility for extracting proportions of the free acid content of citrus and like juices by means of anion exchange or alternatively to convert citric salts to free acid by a cation exchange resin to increase the acidity for other low acid juices.

The taste perception of acidity in the human mouth is not determined entirely by the pH of the substance being tasted, as Kilburn et al carefully explain, but is influenced by other factors, notably sweetness, as well as saltiness and possibly psychological factors. Within the citrus industry, the convention has been adopted of expressing tartness in terms of a ratio of the Brix value of the juice, which is expressed as the number of grams in the juice of soluble solids, mainly consisting of soluble sugars, to the acid concentration, expressed as grams of anhydrous citric acid, per 100 ml of juice. The correlation between this ratio and the perceived tartness of the fruit is now well accepted by the industry and is employed, among other things as a definition for the maturity of the fruit in regulations governing the sale of various types of citrus fruits and juices.

As indicated, Kilburn et al employ as the means for effecting an interchange of ions to and from the juice and electrolyte, an ion permeable membrane in the form of a synthetic film of ion exchange resin, separating alternating juice and liquid electrolyte chambers passed respectively by concurrent flows of juice and liquid electrolyte. A caustic electrolyte, e.g. sodium hydroxide, results in an exchange of hydroxyl ions from the electrolyte for the citrate ions of the juice while an acidic electrolyte results in an exchange of hydrogen ions for cations, e.g., potassium ions, from the citrate salts of the juice.

Kilburn et al acknowledge (column 5, lines 65 through column 6, line 10) their deliberate choice of ion exchange resin films in contrast to the bead form usual for other conventional ion exchange processes but justify their choice on the grounds of the unsuitability of bead form resins for treating the juices in question. Thus, citrus juice typically contains a substantial amount of suspended pulp matter of widely varying particle size and if the juice flow were to be directed downwardly through an ion exchange resin bed in the usual manner, the suspended pulp solids would soon clog the bed to the point of inhibiting further flow therethrough, necessitating an interruption for cleaning.

Further, Kilburn et al judge the regeneration stage, which is an inherent part of conventional bed processes, to be unsuited for citrus juice treatment, leading to contamination and dilution of the juice by the regeneration and/or rinsing liquids. For these reasons, Kilburn et al conclude "Thus, ion exchange resin in bead form is not suitable for continuous operation as required for commercial application."

About a decade later, research on the production of a reduced acid orange juice was spearheaded by the Coca Cola Company, Foods Division, and in the Fall of 1979, a paper was presented on behalf of that group by Dr. K. Assar, entitled "Reduced Acid FCOJ" to the Florida citrus industry, which paper was subsequently published in the "Proceedings of the 19th Annual Short Course for the Food Industry at the Institute of Food and Agricultural Sciences of the University of Florida, Gainesville, Fla." during 1980. This paper describes the efforts of this group to produce and market a reduced acid frozen concentrated orange juice having the approval of both Florida and federal authorities which were eventually successful and led to the promulgation by both the Florida state authorities and the FDA of an approved definition for such a juice, the federal regulation appearing in CFR, Title 21—Foods and Drugs—§§146.150 and 173.25. The research summarized here focused on the acceptability of the reduced acid product from various health aspects, confirming the initial conclusion of Kilburn et al that the ion exchange treatment had no significant consequences on the vitamin content of the treated juice and extending that conclusion to other nutrient components, such as ascorbic and folic acids, minerals and amino acids.

The treatment procedure as described in this paper contemplated the passage of either freshly extracted juice or a diluted form of previously obtained bulk concentrate downwardly through a bed or column of ion exchange resin until the pH of the effluent juice passed below pH 4.6. Either juice was centrifuged to reduce its pulp content before the exchange step, it being noted that removal of some of the pulp content served to inhibit development of high back pressures in the column due to plugging of the resin bed with pulp particles. The possibility of re-introducing added pulp during subsequent processing was mentioned.

The utilization of ion exchange in conjunction with liquid food products other than fruit juices was apparently the subject of research much earlier than in the citrus industry, one important field being in the treatment of milk products. Thus, in U.S. Pat. No. 2,233,178, issued Feb. 25, 1941, there is disclosed for purposes of producing an ice cream high in nonfat milk solids but free of a perceptible grittiness or sandiness in the mouth due to crystallization of lactos therein by treating either whole milk, skim milk, and the like containing nonfat milk solids with or without prior acidification, with an active base exchange material. It was said that the process could be carried out either batchwise or continuously in several different ways. On the one hand, the milk product could be agitated in contact with the finely divided base exchange resin, as in a churn, or the liquid product could be passed either downwardly or upwardly through a bed of ion exchange material maintained if desired under agitation, and prior heating of the milk product was an optional feature to facilitate its passage through the bed.

In U.S. Pat. Nos. 2,465,906 and 2,465,907 the treatment with an ion exchange resin of a different kind of milk product is disclosed; namely, whey. As is known in the art, whey is the milk serum which remains after substantially complete removal of the fat and casein contents of the original milk and consists essentially of an aqueous solution of the milk sugar lactose. More specifically, according to *Modern Dairy Products*, Chemical Publishing Co., Inc., New York, 1970, page 187, a typical whey resulting after precipitation with rennet of the milk fat and casein, contains less than 1% milk protein, about ½% milk fat, about 5% lactose, 1/5% lactic acid and ½% ash, and in excess of 93% water. It differs compositionwise from plain skim milk (page 186) in its reduced milk protein content compared to 3.7% for plain skim milk.

According to the common disclosure of these two patents, the whey is treated to remove a ma3or part of its mineral and acidic (amino acids) content so as to avoid the creation of deposits of calcium phosphate and lactose during subsequent heat treatment. For this purpose, the whey liquid is first contacted with a decationizing medium, i.e, a cation exchange medium to replace its metallic ions with hydrogen atoms with a consequential reduction in its pH value, and then contacted with a de-acidifying medium, i.e., an ion exchange medium, to increase its pH value to about neutrality. In both stages, preference is expressed for directing the whey liquid upwardly through a bed of the particles, in the first stage "in order to disperse said medium and thereby prevent entrapment of particulate matter" (col. 3, ll. 50-53) and the second "in order to flush away precipitate of protein material into a zone of higher pH conditions where the protein is re-dissolved" (col. 3, ll. 69-72).

The most common use of ion exchange resins is in the conditioning of water and the standard procedure in this field is the percolation of the water to be treated downwardly through a fixed bed of the ion exchange resin particles during all active treatment stages of exchange and regeneration. However, upflow has been suggested for the stage of regeneration of the exhausted resin in order that the most active region of the regenerated resin bed would be the last region contacted by the water being treated. When practiced during regeneration, liquid upflow has been carried out with such force or flow velocity as to cause substantial complete inversion of the resin bed, forcing the resin bed upwardly into a fixed condition against an upper retaining member so as to create a bed-liquid relationship in effect the same as existed during downflow, it being recognized that continued compaction of the bed was necessary to avoid channeling. Positive bed compaction means to give added assurance against channeling is shown in U.S. Pat. No. 3,180,825.

In conventional ion exchange methods, after the resin bed has been filled, i.e., soiled with extraneous impurities and any fines from the bed particles, standard operating practice is to subject the bed to upflow for backwashing purposes with a quantity of wash water sufficient to cause an increase or expansion in the volume of the bed, thereby increasing the void or open space volume between the resin particles and inducing a partial fluidization of the bed, such upflow being continued for a sufficient period to flush out all of the undesired matter from the bed. Obviously, however, this backwashing practice is purely a cleansing step unreleated to any ion exchange as such.

DISCOVERY OF THE PRESENT INVENTION

As mentioned above, citrus juice as well as many other natural juices often contains a high content of pulp or suspended solids therein. For example, in orange juice, the pulp solids normally range from about 12 to 13% and for grapefruit juice about 6 to 10%. Furthermore, the pulp content of the juice while not necessarily affecting the theoretical specific gravity of the juice exerts a definite buoyant action within the juice, giving the effect of a higher specific gravity. Typical ion exchange resins that have up to now been approved for the treatment of citrus juices to reduce their acidity have a specific gravity in the range of about 1.1 to 1.2. Manifestly, the difference between the effective specific gravities of the juice being treated and of the ion exchange resin particles is extremely small from a practical standpoint. Further, it is recognized in the art, as noted before, that upflow of the liquid to be treated through a bed of treatment resin is peculiarly susceptible to the occurrence of channeling of the bed; that is, a breaking through of the bed mass by a more or less localized liquid flow at a higher relative velocity which when once developed, tends to establish and promote itself with the result that contact of the liquid with the bed does not take place uniformly throughout the bed area and, further, the liquid passes through the bed without an adequate period of contact for the desired ion exchange reaction.

Whey liquid, as explained above, is inherently a thin, watery fluid having an almost negligible content of suspended solids and even these solids in the form of virtually colloidally sized particles, and consequently, has no analogy whatever with citrus or other fruit juices containing in the order of 10% of pulp having much larger dimensions, and if a problem similar to that underlying the present invention is in reality encountered in the treatment of whey liquids, such problem is of an entirely different order and the suggestions appearing in this context have no reasonable application to the treatment of the juices of the present invention. The liquid upflow of rinse water during backwashing necessarily takes place during an inoperative stage of the treatment sequence when the bed of exchange resin is in an exhausted and soiled condition and incapable of active ion exchange and the wash water itself is inert with respect to such change. Hence, this practice supplies no motivation for any variation in the pattern of liquid flow during the active treatment stages.

For these reasons, before the present invention, it could not have been expected that an acid containing natural juice having a high content of suspended solids could have been effectively brought into ion exchange contact with a bed of ion exchange resin under upflow conditions inducing a slow agitation or partial fluidization of the bed particles, reducing the opportunity for undesired channeling within the bed while promoting uniform contact between juice and resin, without intolerable entrainment of the resin particles within the effluent juice. This is particularly true in view of the presence especially in citrus juice of a small but significant amount of oil which has a natural affinity for the exchange resin particles and could be expected to affect the relative buoyancy of the resin particles during the ion exchange treatment

DETAILED DESCRIPTION OF THE INVENTION

The citrus juice to be processed can be a natural juice extracted in the usual way from fresh oranges but a reconstituted juice can also be treated. A normal fresh orange juice contains approximately 12-13% by wtith pulp and an oil content of about 0.03-0.05% by volume while a normal fresh grapefruit juice contains about 6-10% by weight pulp, and a smaller amount of oil, say about 0.017 by volume. A reconstituted citrus juice is obtained by diluting with water to a predetermined volume, normally at a dilution of four times, referred to in the industry as 3+1, of a juice which has been concentrated, e.g., by evaporation, freeze drying, etc. The presence of large particles of pulp is undesirable for purposes of the concentration technique and, consequently, the fresh juice before concentration is ordinarily centrifuged and/or strained and/or subjected to settling in a settling tank to remove the larger fraction of pulp particles. Thus, a reconstituted orange juice might contain as much as 11-12% pulp and reconstituted grapefruit juice a pulp content as much as about 6-8%, but often somewhat lower in each case, dependent to some extent upon the degree of centrifuging of the juice, the larger particle fraction being the portion removed in both instances. Grapefruit juice pulp is by nature relatively more fine than orange juice pulp and tends to remain in suspension without settling.

The particle size of suspended citrus juice pulp generally falls within the range of 30-400 mesh and the pulp particles have an irregular stringy configuration with a tendency to adhere to contacting surfaces. The specific gravity of the juice typically varies between about 1.06 to 1.12. For exmple, an orange juice having a Brix of 12 may have a specific gravity of 1.09 measured on the basis of dissolved solids alone, that is, free of any pulp. The specific gravity of the pulp itself, at least when suspended within the juice, is considered to be about the same as the juice inasmuch as the pulp particles are fully saturated and ofttimes filled or swollen with the juice; thus, for a given juice sample containing pulp, some pulp particles would appear to float, others to settle while the major portion thereof will remain more or less stably suspended. However, the pulp does impart a distinct buoyant effect to the juice as regards solid particles present therein, tending to cause the same to float.

Upon centrifugation, the pulp particles separate rather poorly from the juice liquid, that is to say, forming a rather diffuse or graduated boundary zone between the pulp particles and the liquid region as contrasted with a sharp line of differentation usually exhibited when suspended solids are centrifuged.

The retention in the treated juice of a substantial proportion of the initial pulp content is an important objective of the present treatment. Virtually all consumers of orange juice are accustomed to the presence of a definitely perceptible content of suspended pulp matter in the juice being consumed and identify the presence of such pulp with an acceptable quality of juice, especially a "fresh" natural juice. Removal of even a major portion of the suspended pulp solids would result in a product that would be perceived as a thin, watery juice by the consumer and thus inferior in quality and perceived flavor. Hence, an important feature of the present invention is the ability to process the juice to reduce its acidity while retaining virtually all of the pulp present in the juice prior to treatment.

Ion exchange resins useful in the present process are of the category known as weak base anionic exchange resins of any recognized commercially available type that has been approved for use in food processing and especially citrus juice processing by appropriate governmental authorities. Such resins as a class are now well recognized in the field of ion exchange and need not be described in exhaustive detail here. In general, the useful resins have a bulk density, as shipped by the manufacturer, in the approximate range of about 35-45 pounds per cubic foot and a specific gravity of about 1.1-1.2 measured when the resin is in its usual moist or fully hydrated condition, containing about 50% water. As is known, these ion exchange resins consist of a matrix component to which is attached one or more active groups and several different matrixes are known to be effective as weak base anion exchange resins, including polystyrene or copolystyrenedivinylbenzene, epoxy-amine condensed from epichlorohydrin and amines or ammonia and phenol-formaldehyde condensation products while the functional groups are selected from among mono and poly amines limited in some cases, especially with sytrene type matrices by chloromethyl groups. One resin that has been found particularly useful in the treatment of both orange juice and grapefruit juice is described as constituted of epichlorohydrin cross linked with ammonia, to form an epoxyamine matrix, and then quaternized with methyl chloride to a relatively low strong base capacity not exceeding 18% of its total exchange capacity. One resin of this type is supplied by Dow Chemical Company of Midland, Mich., under the trade name DOWEX WGR-2 and contains only about 10% quaternary ammonium functional groups with the remainder of such groups being tertiary amines. The resin DOWEX WGR-2 has a fairly high bulk density of about 43 pounds per cubic foot and a specific gravity of between about 1.15 and 1.20. Another specific resin useful especially for orange juice has a matrix of polystyrene cross linked by chloromethylation and then aminated with trimethylamine, dimethylamine, diethylenetriamine or dimethanolamine. One version of the latter type which is aminated with dimethylamine is available from Dow Chemical under the trade name DOWEX 66 having a bulk density of about 40 pounds per cubic foot and a specific gravity of 1.13–1.15, while another version having a copolystyrene-divinyl benzene matrix and tertiary amine functional groups is sold under the designation AFP 329 by Cybron Corp., Chemical Division of Birmingham, N.J. Other comparable resins from other manufacturers should behave more or less equivalently here, and other weak base anionic resins than those described above, including those modified for increased density and structural integrity will also fall within the scope of the invention.

The ion exchange resins are supplied generally in the fine spherical beads of a size of roughly 0.02 inches, falling within the range of 20–40 mesh for an average of about 30 mesh. Larger size beads, when available, should be equally useful. As an example, the resin DOWEX WGR-2 ranges in size from 20–50 mesh with approximately 85% by weight falling between about 25 and 35 mesh.

It is believed that the ion exchange resin of the invention functions when employed for ion exchange with juices containing weak organic acids, such as citric acid or the like, in adsorbing the entire acid molecule, instead of participating in a mutual exchange of ions as in conventional ion exchange reaction wherein an undesirable anion, for instance, is extracted from the liquid being treated and replaced with a more desirable anion supplied by the exchange resin itself. However, although weak base anionic resins normally have an affinity for strong or highly ionized acids, it is conceivable that citric acid is present in dissociated form in the juice being treated so that only the citrate moiety is removed from the juice to be replaced presumably with a hydroxyl group supplied by the anion exchange resin and the effective performance of the present invention is not intended to be limited by the particular theoretical explanation by which the extraction mechanism takes place. Whatever the theoretical explanation, the affinity or adsorption of the resin for the citric acid increases with increasing acid concentration.

A critical feature of the present invention is the introduction of the juice to be treated at a point below an initially static bed of particles of the weak base anionic exchange resin at a velocity through such bed which is sufficient to cause the bed to undergo a substantial expansion from its static starting volume of at least about 20–25% and more advantageously 40–60% or possibly higher, such expansion being preferably accompanied by a slow rolling action or gentle natural current over at least a part of the bed depth, and more preferably throughout the entirety of such depth. For purposes of this description, the slow rolling action just described is deemed the equivalent of a partial fluidization of the bed particularly when combined with the requisite degree of bed exchange. In general for the above-identified resins a localized flow velocity of the juice being treated of at least about 1 gpm/ft$^2$ of bed area has been found necessary to achieve the minimum needed degree of bed expansion and higher velocities of 2.0–2.5 gpm/ft$^2$ are better especially to also cause the slow rolling condition. As the localized velocity is increased, the expansion and rolling or churning action likewise increases, but such increase should not be carried to the point of provoking the upflow of a significant amount, say about 1% or more, resin particles outside the limits of the expanded bed and into the effluent liquid leaving the treatment vessel. The upflow operation condition of the invention has proved to be susceptible to this problem of carryover of the resin into the effluent liquid, but the problem can be reduced to a quite tolerable minimum if the throughput velocity does not exceed about 4.0 grp/ft$^2$ of bed area for the above resins.

Optionally, one can combine the upflow movement of the juice being treated with mechanical agitation with a view to decreasing the upflow velocity of the juice while still maintaining the moving bed condition appropriate for effective ion exchange contact with the juice. For this purpose, a single or multi-bladed paddle type agitator can be disposed within the resin bed for rotation about a centrally supported shaft, the speed of rotation being selected to achieve the desired degree of mechanical agitation, say in the order of 10 rpm. However, it has been found from practical experience that mechanical agitation tends to produce structural disintegration of the resin particles, breaking down the original resin particles into smaller particles or fines which is undesirable. Consequently, the preferred operation of the present method avoids the use of mechanical agitation especially since the desired bed condition can readily be achieved via throughput velocity alone. Further, operating economy calls for operation at fairly high throughput velocities in order to maximize production output and a reduction in throughput velocity augmented by mechanical agitation to arrive at an equivalent bed condition which is contraindicated on this basis.

The result of passing the juice to be treated through the ion exchange bed maintained in the above defined expanded condition produced at least principally by means of the throughput velocity of the juice itself is to maintain the bed in an open or separated condition wherein individual resin particles are in intimate contact with the juice conducive to effective removal of the citric acid from the juice, while clearnace spaces are provided between the bed particles for the relatively free passage of suspended pulp. In addition, the slow rolling or partial fluidized motion of the bed not only promotes more uniform contact between bed particles and juice, but avoids entrapment of suspended matter particles at any localized static regions of the bed. The rolling action proceeds gradually throughout substantially the entirety of the bed volume, although it may be perceived most noticably in the upper several inches of the bed depth particularly at relatively low throughput velocities, and if pulp particles should become entrapped in temporarily stationary bed locations, these locations will eventually be reached by the rolling action and disturbed thereby so as to permit the escape of the pulp particles.

It is, of course, necessary that the juice be maintained in contact with the bed a sufficient time to permit a substantial amount of its acid content to be removed by the ion exchange action It is generally recommended by the supplier that the throughput velocity of the juice should not exceed a maximum of about 2 gpm/ft$^3$ of resin. Obviously, higher rates at lesser contact times could be useful if need be but at a commensurate loss in exchange efficiency. In general, the throughput velocities within the operating range explained above will be well within this limit, but with different resins the possibility exists that higher throughput velocities will be needed to produce the desired degree of bed expansion and for such resins the maximum upper limit of 2 gpm/ft$^3$ of resin for efficient acid removal must be observed.

As mentioned earlier, the fundamental upflow mode of operation of the invention has a natural tendency to separate some resin particles from the body of the bed as a whole which become entrained within the liquid in its passage out of the bed and thence out of the treatment vessel as the effluent product. Quite remarkably, this tendency appears on the basis of close observation to be largely attributable to an inclination for the individual resin particles to agglomerate or cling together in an irregular cluster which, for reasons not at all understood, appears to have a greater buoyancy than the individual resin particles themselves. Conceivably, the resin particle cluster may initiate around a relatively buoyant pulp particle. But in any case these resins clusters when once formed and detached from the bed proper exhibit a surprisingly strong buoyant action and tend to continue rising even after departure from the rolling region of contact into the quiescent upper freeboard area of the vessel. In fact, the buoyant effect of such clusters could not be reversed by a substantial decrease in the upflow velocity of the juice at the top of the freeboard region created deliberately by a significant expansion in the cross-sectional area of the vessel.

It has not proved possible up to now to totally inhibit the formation of the just described buoyant resin clusters although the quantity of such clusters as a proportion of the volume of juice being treated which occurs during proper operation is extremely minute. Hence, it is preferred in the practice of the invention where the juice production must be virtually entirely free of resin particles to provide in some way for their separation. The choice of the particular approach to this end will vary with a particular combination of operating conditions. For example, a settling stage and/or skimming means should prove effective where such a stage does not otherwise interfere with the process. Alternatively, the treatment unit can be modified to incorporate means to positively filter away the resin particles. For example, a screen can be provided across the effluent outlet or, more preferably, a tubular filter screen disposed within a readily detachable casing connected to the output of the treatment vessel in which the juice approaches the screen via an annular surrounding space and leaves through its hollow interior, or vice versa, in order to avoid the necessity for opening the exchange vessel itself for cleaning purposes. A screen size found effective for filtering the effluent is about 50 mesh and produces a product virtually completely free of resin particles. Obviously, any screening device will after a sufficient period of operation become sufficiently clogged with resin particles as well as some pulp particles as to cause an unacceptable high pressure drop thereacross, requiring cleaning. The loss in operating time for cleaning can be negligible when coordinated with regeneration and could in any case be avoided by connecting two such screening devices in parallel for alternate active operation and cleaning.

The presence of small amounts of entrained resin particles in the juice product is of lesser importance where the juice is intended for ultimate concentration in the manner common in the citrus industry. A conventional citrus juice concentration plant includes separating means, such as a cyclone separator, situated upstream of the actual evaporation or similar stage so as to remove, as already mentioned, large pulp particles or other suspended solids, such as sand, from the juice prior to evaporation. Such separating means would serve equally to remove any resin particles that might be present in the juice to be concentrated, especially with agglomerated form of such particles causing them to be particularly responsive to centrifugal separation. Thus, the problem of resin entrainment is acute primarily in the case of juice that is intended to be marketed as "fresh" or single strength juice and in that event, supplemental removal techniques described above should normally be considered for such products.

It is known in the art of ion exchange to utilize both single stage and multi-stage treatment units, wherein a plurality of single stages are stacked vertically with each stage supported by a porous plate or screen and having sufficient freeboard space between the bed surface therein and the next adjacent stage. The advantage of the multi-stage unit is to achieve for a given column diameter an increase in the overall bed volume and thus an increase in the overall product output of the unit. Either of these arrangements is in principle suitable for the present invention, but it is presently believed that the single stage is more advantageous in this invention given the necessity for maintaining the throughput velocity within certain defined limits which imposes a practical maximum upon the system operation independently of the number of stages.

The process of the present invention has been found highly effective in reducing the acid content of the juice without any significant change in its sugar content, as measured by the Brix value, and the net effect for the juice is, therefore, a very substantial increase in the ratio of Brix value to acid content. For example, a normally operating column following the invention can readily achieve a reduction in acid content of 90-95%, giving ratios of 75 or higher. A ratio of at least 50 indicates the removal of most of the acid. Even under less optimum conditions, a ratio in excess of about 30 is easily attainable, compared to a normal ratio for orange juice of about 12-14 and for grapefruit juice of about 8-9, and this ratio volume of 30 is the practical minimum for the invention. It will be appreciated that such ratio values exceed this presently proscribed limits by the federal authorities, as referred to above. However, the normal practice in the industry is to blend the treated reduced acid product with an untreated juice and thereby adjust the ratio of the final product to an optimum level without the acceptable limits. For purposes of such blending, a ratio reduction which in itself might be excessive, becomes advantageous in allowing maximum flexibility in the blending stage. The treated product of the invention at maximum levels of acid reduction has distinctive taste, quite uncharacteristic of the taste of normal orange juice. Thus, in the mouth, the treated product is even to the untrained taste, distinctly more sweet than the untreated juice and virtually free of the sharp piquancy of ordinary orange juice. Indeed, the treated product has a bland even flat taste which would be primarily appealing to those having an aversion to tartness. For this reason, blending the treated with untreated juice will represent the typical way of utilizing the treated product.

Apart from the upflow condition imposed during the active and regeneration stages of the treatment, the present process follows the sequence that is normal in ion exchange processes generally, and these secondary stages need not be explained in detail here. Briefly, the resin is introduced into the column, either by direct loading where the design of the column permits the same, ro by a fluid inflow such as by aspiration. After the desired quantity of resin has been loaded into the column, the resin is washed with water, passed downwardly through the body of resin which causes the resin particles to settle in a more or less uniform bed. The ion exchange operation is then carried out until the desired quantity of juice has been processed or the resin bed has reached an exhausted condition as regards its ion exchange capacity. Such an exhausted condition can be detected by a sharp rise in the acid content of the treated juice approaching the normal or original acid content of the untreated juice. Generally, speaking, once the exchange process of the invention has achieved a stable operating condition, extracting at least 50% and more normally 80-90% or more of the acid content of the juice, this level of efficiency continues during virtually the entirety of the operation without significant alteration until the resin bed reaches exhausted condition, at which time the acid content rises sharply. After the ion exchange stage has been completed, the bed is then flushed or backwashed with upflowing water to remove residual juice therefrom. The backwashing time is important to good regeneration and should be a minimum of 15 minutes and sufficient to flush out residual juice and any large particles that may have become entrapped. Then the resin bed is subjected to regeneration by passing therethrough a regenerating liquid in a downflow direction. The regeneration liquid consists of a dilute aqueous solution of alkali of which ammonium hydroxide, say at a concentration of 4%, is preferred. Other alkali solutions of similar concentration, for example, of sodium or potassium hydroxide could be used but are less desirable from the standpoint of avoiding the possibility of introducing alkali metal ions into the treated product in the light of the present concern over undesirable health effects. The regeneration is continued in the standard manner in the art for a time sufficient to bring the resin bed back into active condition and, dependent upon the volume of resin, 30 minutes or so will ordinarily assure complete regeneration at a flow velocity of say 1 gpm/ft³ resin. After regeneration, the bed is rinsed for several minutes until any residual regenerating liquid is flushed away and then allowed to drain free of residual water. Then, the column is ready for reuse.

The presence in the bed of residual rinse water does result in modest dilution of the juice at the beginning of the ion exchange, as manifested by a slight drop in Brix value, but this effect is brief and causes no significant problems.

It was feared that the considerable amount, relatively speaking, of organic matter in the fruit juices being processed might result in a gradual deterioration of the ion exchange capacity of a given body of ion exchange material over repeated cycles of active operation and regeneration. However, tests carried out to evaluate this effect showed that for as many as seven consecutive cycles of operation and regeneration, no detectable loss in the active capacity of the bed could be observed, and it thus appears that the resin bed remains operative in the present invention indefinitely for all practical purposes.

The effect of the regeneration stage is to form a salt between the citric acid, or citric acid moiety and the alkaline ion of the regeneration liquid, e.g., ammonium citrate, which is soluble and is carried off in dissolved condition in the regeneration liquid. Recovery measures can be applied to the regeneration liquid to extract the citric acid therefrom either as a different soluble salt or as free citric acid. For this purpose, for example, the regeneration liquid could itself be subjected to ion exchange with a strong base anionic exchange resin in a conventional ion exchange system so as to remove the alkaline ions and generate free citric acid.

In addition to other citrus juice, e.g., lemons and limes, the present process is applicable to juices from pears, apples, peaches and the like, just to mention a few.

Examples:

EXAMPLE 1

A laboratory demonstration column was devised from a plexiglass tube 2¾ inches in interior diameter and approximately 30 inches in height, the tube having a laterally directed inflow conduit adjacent one end and an outflow conduit at the other end. This column was loaded to approximately 8 inches in height with the anionic exchange resin DOWEX WGR-2 in the amount of resin equalling 283 ml (equivalent to 0.01 ft³). A reconstituted orange juice having a relatively low pulp content of about 4–6% was delivered to the inflow conduit at an actual rate of about 76 ml/min (equivalent to 2 gpm/ft³ resin and to approximately 1 gpm/ft² of bed area). This quantity of juice flow caused a modest expansion of resin bed of about 30% with a noticable rolling action moving predominately upward on one side and downwardly on the opposite side of the column. The initial orange juice had a Brix value of 10.00, an acid content of 0.67% having a ratio of 14.9%. A total of 2.32 gal (equivalent to 232 gal/ft³ resin) was passed through the column before the resin evidenced exhaustion. At five minute intervals during the test, samples of the treated juice effluent were taken and were analyzed for Brix value and acid content from which the ratio was calculated and the results of these observations appear in the tabulation appearing in the following Table 1. When the composite effluent was similarly analyzed, a Brix value of 9.84, an acid content of 0.37% for a ratio of 26.82 were noted.

TABLE 1

| Elapsed Time (min) | Brix No. | Acid - % | Ratio (Brix/acid) |
|---|---|---|---|
| 0 | 10.0 | 0.67 | 14.9 |
| 5 | 7.6 | 0.08 | 95 |
| 10 | 10.0 | 0.10 | 100 |
| 15 | 9.8 | 0.25 | 39.2 |
| 20 | 10.1 | 0.40 | 25.3 |
| 25 | 10.0 | 0.30 | 33.3 |
| 30 | 10.0 | 0.30 | 33.3 |
| 35 | 10.0 | 0.32 | 31.2 |
| 40 | 10.0 | 0.40 | 25.0 |
| 45 | 10.0 | 0.42 | 23.8 |
| 50 | 10.0 | 0.36 | 27.7 |
| 55 | 10.0 | 0.42 | 23.8 |
| 60 | 10.0 | 0.44 | 22.7 |
| 65 | 10.0 | 0.58 | 17.2 |
| 70 | 10.0 | 0.50 | 20.0 |
| 75 | 10.0 | 0.50 | 20.0 |
| 80 | 10.0 | 0.50 | 20.0 |
| 85 | 10.0 | 0.54 | 12.5 |
| 90 | 10.0 | 0.65 | 15.4 |
| 95 | 9.84 | 0.37 | 26.82 |

EXAMPLE 2

The test of Example 1 was repeated with reconstituted orange juice except that the column was loaded with a comparable amount (0.01 ft³ resin) of the resin DOWEX 66. A total of 2.2 gal (equivalent to 220 gal/ft³ resin) was passed through the column before resin exhaustion occurred and during the treatment the resin was observed to expand approximately 50% (DOWEX 66 has a lesser density than DOWEX WGR- 2). The starting values of the reconstituted orange juice were the same as in Example 1; namely, a Brix of 10.00, an acid content of 0.67% for a ratio of 14.9. As before, samples of the treated juices were taken at 5 minute intervals and tested for Brix value and acid content and the corresponding ratios calculated, the results of which appear in Table 2 below. The overall effluent when similarly tested exhibited a Brix of 9.80, an acid content of 0.33% for a final ratio of 30.05%.

TABLE 2

| Elapsed Time (min) | Brix No. | Acid - % | Ratio (Brix/acid) |
|---|---|---|---|
| 0 | 10.0 | 0.67 | 14.9 |
| 5 | 7.2 | 0.02 | 360 |
| 10 | 9.6 | 0.08 | 120 |
| 15 | 9.6 | 0.12 | 80 |
| 20 | 10.0 | 0.35 | 28.5 |
| 25 | 10.0 | 0.29 | 34.4 |
| 30 | 10.0 | 0.45 | 22.0 |
| 35 | 10.0 | 0.42 | 23.8 |
| 40 | 10.0 | 0.38 | 26.3 |
| 45 | 10.0 | 0.38 | 26.3 |
| 50 | 10.0 | 0.38 | 26.3 |
| 55 | 10.0 | 0.38 | 26.3 |
| 60 | 10.0 | 0.36 | 27.7 |
| 65 | 10.0 | 0.36 | 27.7 |
| 70 | 10.0 | 0.36 | 27.7 |
| 75 | 10.0 | 0.40 | 25.0 |
| 80 | 10.0 | 0.40 | 25.0 |
| 85 | 10.0 | 0.38 | 26.3 |
| 90 | 10.0 | 0.36 | 27.7 |
| 95 | 10.0 | 0.34 | 30.0 |
| 100 | 10.0 | 0.49 | 20.4 |
| 105 | 10.0 | 0.60 | 16.7 |
| 110 | 9.80 | 0.33 | 30.05 |

EXAMPLE 3

The experiment in Example 1 above was repeated using a reconstituted grapefruit juice characterized by a low pulp content, the ion exchange resin being DOWEX WGR-2 as in Example 1 in the same amount. The initial characteristics of this grapefruit juice were a Brix of 14.55, an acid content of 1.47% for a ratio of 9.90. The grapefruit juice was passed through the column at the same velocity before, i.e., equivalent to 2 gpm/ft$^3$ resin, until a total of 1.55 actual gallons had been treated (equivalent to 155 gal/ft$^3$ resin). As before, samples of the treated juice were taken at five minute intervals and analyzed for Brix value and acid content from which the ratio was calculated and the results are tabulated in Table 3 below. Analysis of the overall collected effluent showed for the treated grapefruit juice a Brix value of 13.72, an acid content of 0.41% and a ratio of 33.46%.

TABLE 3

| Elapsed Time (min) | Brix No. | Acid - % | Ratio (Brix/acid) |
|---|---|---|---|
| 0 | 14.55 | 1.47 | 9.90 |
| 5 | 7.4 | 0.18 | 41.1 |
| 10 | 9.6 | 0.30 | 32.0 |
| 15 | 10.8 | 0.44 | 24.5 |
| 20 | 12.4 | 0.53 | 23.4 |
| 25 | 13.2 | 0.63 | 20.9 |
| 30 | 12.8 | 0.58 | 22.1 |
| 35 | 13.6 | 0.70 | 19.4 |
| 40 | 14.0 | 0.75 | 18.7 |
| 45 | 13.8 | 0.62 | 22.3 |
| 50 | 14.2 | 0.76 | 18.7 |
| 55 | 14.2 | 0.76 | 18.7 |
| 60 | 14.4 | 0.92 | 15.6 |
| 65 | 14.4 | 1.36 | 10.6 |
| 70 | 13.72 | 0.41 | 33.46 |

EXAMPLE 4

The experimental column of Example 1 was again tested for acid reduction of a single strength orange juice and continued for roughly one hour's time, and test samples were taken at severa points during this interval and were analyzed as in the previous examples. The properties of the starting juice, the successive samples as well as the average of the final treated product are summarized in the following Table 4. The resin used was DOWEX WGR-2, and the flow velocity for this column was 1 gpm/ft$^3$ resin, the amount of resin being as before (0.01 ft$^3$).

TABLE 4

|  | Time | Brix | Acid | Ratio |
|---|---|---|---|---|
| Starting juice | 12:00 | 10.76 | 0.82 | 13.12 |
|  | 12:15 | 10.00 | 0.41 | 24.39 |
|  | 12:35 | 10.00 | 0.45 | 22.22 |
|  | 12:50 | 10.30 | 0.63 | 16.35 |
| Treated product average |  | 10.10 | 0.50 | 20.99 |

EXAMPLE 5

A more extensive test using the column of Example 1 was carried out on a low pulp reconstituted grapefruit juice, using as the resin DOWEX WGR-2 in the same amount as in previous examples. The test was carried out in two stages with an interruption therebetween as noted and during each stage samples of the treated product were taken and were analyzed for the characteristic values noted above, and these values are summarized in the following Table 5 together with initial values for the starting juice at the beginning of each stage and the average values of the treated product for each stage. The treatment velocity was 1 gpm/ft$^3$ resin for each stage.

TABLE 5

|  | Time | Brix | Acid | Ratio |
|---|---|---|---|---|
| Stage A - starting juice | 10:50 | 10.45 | 1.27 | 8.23 |
|  | 11:00 | 8.93 | 0.64 | 13.95 |
|  | 11:15 | 9.64 | 0.71 | 13.58 |
|  | 11:35 | 9.98 | 0.88 | 11.34 |
|  | 11:45 | 9.66 | 0.81 | 11.93 |
|  | 12:15 | 10.17 | 0.86 | 11.83 |
|  | 12:30 | 10.20 | 1.00 | 10.2 |
|  | 12:45 | 10.40 | 0.98 | 10.61 |
| Treated product average |  | 9.85 | 0.84 | 11.92 |
| Stabe B - starting juice | 12:50 | 10.46 | 1.30 | 8.05 |
|  | 1:00 | 9.59 | 0.95 | 10.09 |
|  | 1:30 | 10.29 | 0.93 | 11.06 |
|  | 2:00 | 10.15 | 1.09 | 10.09 |
|  | 2:30 | 10.03 | 1.15 | 8.72 |
|  | 3:00 | 10.34 | 1.11 | 9.32 |
| Treated product average |  | 10.08 | 1.03 | 9.85 |

EXAMPLE 6

To illustrate the operation of the process of the invention with a multi-stage exchange column, a laboratory scale multi-stage column was obtained formed of a vertical stack of eight individual stages, each stage being one foot in vertical height and an internal diameter of four inches, each stage having at its ends a peripheral flange for attachment with bolts to the next stage with intervening gasketing for sealing purposes, a Perforated mesh or screen of about 30 mesh being held at each such joint to support the resin. A total of approximately 1 ft$^3$ of DOWEX 66 was employed, distributed evenly throughout the five lower stages of this column, the upper three stages being left empty. The column was equipped with central liquid inlet and outlet ports at its upper and lower ends. This multi-stage column was employed for the treatment of single strength orange juice delivered at a rate of 2 gpm/ft$^3$ resin which produced an expansion of approximately 50% of the resin bed in each of the bed stages. The bed height for each of these stages was approximatey eight inches so that the expansion occupied most of the available freeboard area. The starting juice was analyzed for its characteristic values as were samples taken during the course of the experiment, and these values together with a set of average values for the treated product are summarized in Table 6 below. As the table notes, the system experienced difficulties shortly after treatment was begun, primarily in the form of leakage at the seals between stages which required correction before the test was continued.

TABLE 6

|  | Time | Brix | Acid | Ratio |
|---|---|---|---|---|
| Pretreatment influent | 12:50 | 10.76 | 0.82 | 13.12 |
|  | 1:00 | 9.8 | 0.04 | 245 |
| System malfunction & repair | 1:15–2:15 |  |  |  |
|  | 2:35 | 10.2 | 0.16 | 63.75 |
|  | 2:50 | 10.4 | 0.11 | 94.55 |
|  | 3:05 | 10.4 | 0.20 | 52.00 |
|  | 3:15 | 10.7 | 0.16 | 66.88 |
| Treated product average |  | 10.43 | 0.15 | 69.30 |

What is claimed is:

1. In a method of treating with an ion exchange exchange resin an acidic edible natural juice containing a significant concentration of pulp solids suspended therein to reduce the acidity of such juice without significantly impairing its natural sweetness or reducing its pulp solids content, the improvement which comprises passing the juice to be treated through a laterally confined vertically unconfined supported particulate bed of a weakly basic anionic exchange resin of sufficient volume relative to the throughput of juice being treated to substantially reduce the acid content of such juice by an ion exchange reaction, said juice being passed upwardly through said resin bed at a generally uniform rate throughout the bed cross-sectional area which is sufficient to produce a vertical expansion of said bed of at least about 20–25% and sufficient to pass substantially said pulp solids but insufficient to cause substantial entrainment of resin particles with the treated juice effluent.

2. The method of claim 1 wherein the velocity of said juice flowing upwardly through said bed is sufficient to produce a bed expansion of about 50%.

3. The method of claim 1 wherein the velocity of flow of said juice through said bed is sufficient to impart to the bed a slow rolling motion apparent at least adjacent the upper surface of said bed.

4. The method of claim 1 wherein after a sufficient amount of said juice has been passed through said bed as to substantially exhaust the ion exchange capability of the resin particles thereof, said bed is treated with a regeneration liquid effective to restore the ion exchange capacity thereof.

5. The method of claim 4 wherein said regeneration liquid is a dilute aqueous solution of ammonium hydroxide.

6. The method of claim 4 wherein said regeneration liquid is passed downwardly through said resin bed.

* * * * *